United States Patent [19]
Chandler

[11] 3,754,322
[45] Aug. 28, 1973

[54] METHODS OF MAKING PRINTED CIRCUIT COIL

[75] Inventor: David Horace Chandler, Essex, England

[73] Assignee: The Marconi Company Limited, London, England

[22] Filed: Mar. 22, 1971

[21] Appl. No.: 126,617

[30] Foreign Application Priority Data
May 14, 1970  Great Britain .................... 23,332/70

[52] U.S. Cl. ..................... 29/625, 29/624, 174/68.5, 313/67, 335/213
[51] Int. Cl. ............................................. H05k 3/22
[58] Field of Search ...................... 336/200; 29/602, 29/606, 605, 607, 625, 624; 335/213

[56] References Cited
UNITED STATES PATENTS
2,830,212  4/1958  Honlet ........................... 335/213 X
3,015,152  1/1962  Marley ........................... 335/213 X
3,430,169  2/1969  Garoon .............................. 335/213

Primary Examiner—Richard J. Herbst
Assistant Examiner—Joseph A. Walkowski, Jr.
Attorney—Baldwin, Wight & Brown

[57] ABSTRACT

A printed circuit coil for a cathode ray tube is shaped so that it can be bent to form a flared coil. When the coil is flat the turns of the coil each consist of three portions. The first portion comprises a pair of conductive lengths diverging towards one end of the coil and joined there by an arcuate length, the second is a pair of lengths joined at the other end of the coil by a straight length, and the third is a pair of curved conductive lengths completing the turn.

2 Claims, 1 Drawing Figure

Patented Aug. 28, 1973
3,754,322
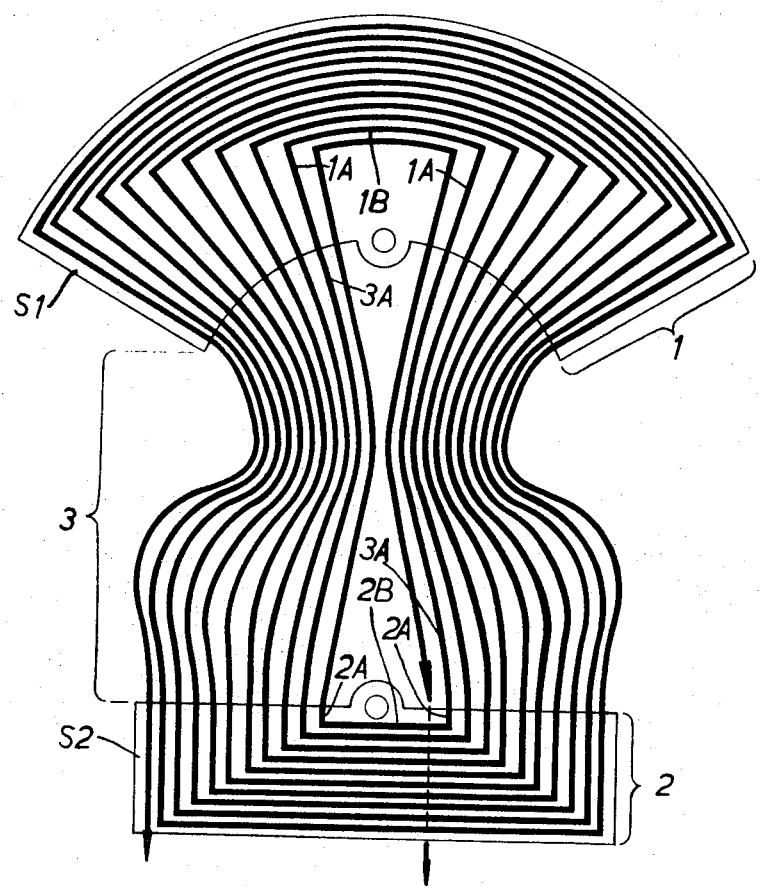
Inventor:
David Horace Chandler
BY Baldwin Wight & Brown
Attorneys

METHODS OF MAKING PRINTED CIRCUIT COIL

This invention relates to cathode ray tube apparatus and more specifically to cathode ray tube apparatus of the kind in which deflection of the beam in a cathode ray tube is effected by electro-magnetic deflection means. The invention is primarily intended for, but is not limited to, the making of electro-magnetic deflection means for cathode ray display tubes and television and like camera tubes.

It is well known in apparatus of the kind referred to to use printed circuit coils for producing electro-magnetic deflection in the tube. Printed circuit coils have many advantages for such use, notably that they are compact and can be made, repeatably and with precision, to a predetermined required design. This means that the deflection characteristics of the deflection system and also the positions in the frequency scale of wanted and unwanted resonances are precisely repeatable. A further advantage is that because accurate positioning (also precisely repeatable) of the end turns of a coil is readily attainable minimum distortion of the cathode ray spot is achievable. Yet another advantage is that because, when printed circuit coils are employed, a high proportion of the total volume occupied by the deflection coil system is filled with copper, lower resistance is attainable than with comparable ordinary wire windings. These advantages are particularly manifest in the case of a push-pull deflection system for, with printed circuit coils, "push" and "pull" windings can be located with repeatable precision on the outer surfaces of a three-layer printed circuit structure the inner layer of which is employed for coil interconnections.

It is also well known to use so-called "flared" coils, i.e., coils the radius of which, measured from the axis, is increased over part of the length towards one end, in electro-magnetic deflection systems. The main advantages of flared coils are that they are economical in power consumption; result in an increased length of coil for a given deflection so that there is reduced current and increased voltage and thus reduced resistive losses; and have better cooling. Hitherto, however, flared coils have been wire wound because of the difficulty of making a three-dimensional flared coil from a two-dimensional printed circuit. The present invention seeks to solve this problem and to provide an easily manufactured, satisfactory flared printed circuit coil which is formed from a planar printed circuit.

According to use of the method of this invention a cathode ray tube apparatus includes an electro-magnetic deflection system comprising a plurality of bent up flared printed circuit coils each of which, before bending and when flat, has a conductive printed coil of turns each of which consists of three portions namely a first portion with a first pair of conductive lengths diverging in the direction of one end of the coil and joined at their outer ends by a transverse arcuate length, a second portion with a second pair of conductive lengths joined at their outer ends towards the other end of the coil by a transverse substantially straight length and a third portion with a third pair of curved intermediate conductive lengths joining the inner ends of the first pair of lengths to the inner ends of the second pair of lengths, all the lengths of the third pairs being of substantially equal developed length, the pairs of lengths on the first and second portions being carried by insulating substrate of sufficient stiffness to hold said lengths in their original dispositions and the whole arrangement being such that by bending the end regions of the coil and stretching it lengthwise until the curved conductive lengths are straightened, there is formed a flared printed circuit coil of required three-dimensional form. By suitable dimensioning a flared printed circuit coil of any practically desirable shape may be made — including one which is trumpet-shaped in section.

In one use of the invention there is substrate only at the end regions of the coil, there being none in the region where the conductive lengths of the third pairs are situated.

In another use of the invention there is substrate material carrying the conductive lengths at all regions of the coil, that in the region where the conductive lengths of the third pairs are situated being sufficiently extensible to permit the end regions to be drawn apart until the originally curved conductive lengths are straightened.

According to a feature of this invention a method of manufacturing a flared printed circuit coil for an electro-magnetic deflection system of a cathode ray tube comprises the steps of forming a pattern of conductors upon a flat insulating carrying substrate, said pattern being that of a coil of turns each of which consists of three portions namely a first portion with a pair of conductive lengths diverging in the direction of one end of the coil and joined at their outer ends by a transverse arcuate length, a second portion with a pair of conductive lengths joined at their outer ends towards the other end of the coil by a transverse substantially straight length and a third portion with a pair of curved intermediate conductive lengths joining the inner ends of the divergent lengths to the inner ends of the substantially parallel lengths, said curved lengths being of substantially equal developed length; removing the substrate material in the region where the conductive lengths of the third portions of the turns are situated; and bending the regions where substrate is left and drawing apart aid regions to straighten the originally curved conductive lengths.

According to another feature of this invention a method of manufacturing a flared printed circuit coil for an electro-magnetic deflection system of a cathode ray tube comprises the steps of forming a pattern of conductors upon a flat insulating carrier substrate with an extensible middle part, said pattern being that of a coil of turns each of which consists of three portions namely a first portion with a pair of conductive lengths diverging in the direction of one end of the coil and joined at their outer ends by a transverse arcuate length, a second portion with a pair of conductive lengths joined at their outer ends towards the other end of the coil by a transverse substantially straight length and a third portion with a pair of curved intermediate conductive lengths joining the inner ends of the divergent lengths to the inner ends of the substantially parallel lengths, said third portion being carried by the extensible middle part of the substrate and said curved lengths being of substantially equal developed length; and bending the substrate and drawing apart the ends of the coil to straighten the originally curved conductive lengths.

The invention is illustrated in the accompanying drawing which shows diagrammatically an intermediate stage in the manufacture of one form of 90° flared printed circuit coil for an electro-magnetically deflected cathode ray tube apparatus in accordance with this invention.

Referring to the drawing a printed circuit coil is formed by any convenient known technique of printed circuit manufacture upon a sheet of insulating flexible substrate which is not fully shown in the figure. The conductive material used will normally be copper and the insulating material may be any known suitable material flexible enough to be bent, e.g., the material known as "Mylar." The turns of the coil may be regarded as consisting of three portions, namely two end region portions indicated by the brackets 1 and 2 and an intermediate or third portion indicated by the bracket 3. The conductive lengths of a turn portion 1 comprise two divergent lengths such as 1A which diverge from one another and are joined at their outer ends in the region of one end of the coil by a transverse arcuate length such as 1B. The conductive lengths of a turn portion 2 comprise two parallel lengths such as 2A joined by a transverse straight length such as 2B. The conductive lengths of a turn portion 3 comprise two curved lengths such as 3A which join the appropriate lengths 1A and 2A. The curved lengths 3A are, as shown, of different curvatures but are all of the same developed length, i.e., of the same length measured along the curves.

It is assumed that the substrate on which the coil is formed is initially a sheet (not fully shown) and, after the coil is formed thereon, a part of the sheet following the outer contour of the coil a little outside it, is stamped out of the sheet. The middle part of the stamped out part of the sheet is then dissolved away by a suitable solvent which will not attack the copper so as to leave substrate only in the end regions where the portions 1 and 2 of the coil turn are situated. These regions where the substrate is left are indicated by the references S1 and S2. These end regions are then bent so that the region 1 lies on the surface of an imaginary cylinder and the region 2 lies on an imaginary conical surface co-axial with the cylinder. The coil is then stretched endwise to draw apart the regions 1 and 2 and straighten the curved conductive lengths 3A which will then lie on said conical surface. The angle of embrace of the cylinder and cone will, in normal practice be approximately 180°. The final result (not illustrated) is a flared printed circuit single layer "saddle" coil in the form of a half cylinder merging with a half cone, the regions 1 and 3 being on the surface of the half cone. The necessary bending and stretching can easily be effected with the aid of simple jigs. The final coil is mechanically strong and of the required flared shape.

The foregoing construction is not convenient for a double layer or multi layer coil because there is no substrate in the region 3. For such coils it is better to employ a modification using a substrate having stiffish end regions and a middle part, in the region 3, which is sufficiently extensible to allow of endwise stretching to straighten the originally curved conductors 3A. Celluloid is a suitable material for such a substrate. This modification is like that already described except that the middle part of the substrate is not removed (as it is in the illustrated embodiment) but is of such material and construction as to be extensible to the required extent. In one way of making such a multi-layer coil — exemplifier for a two-layer coil — the starting material is a sheet of relatively rigid thin insulating material clad with copper on both sides, the copper layer on one side being considerably thicker than that on the other. Required layer interconnections are formed by the usual photographic and etching processes which removes copper from the thin layer leaving the interconnections and exposing the insulation elsewhere on that side. The insulating material in the middle of the sheet i.e., between the ends, is then dissolved away. A piece of soft flexible adhesive material — thin synthetic sheet — is applied between the remaining ends i.e., where the original insulating material was dissolved away. This process is repeated resulting in a second insulating sheet also having relatively rigid ends and a quite flexible middle. The interconnections may not be required on the second sheet, in which case they would be omitted and a "starting" sheet copper clad on one face only would be used. The two sheets are then stuck together face to face with the inter-connections in the middle between them. The composite sheet now has relatively thick copper layers on its outer faces. Windings are then formed by a photographic and etching process in the thick copper layers — the windings on the two faces will ultimately form the two layers in the finished coil — and the resultant structure is bent and its ends drawn apart as already described. If required, as a final step before bending, the thin insulating material in the middle portion of the coil may be dissolved away.

I claim:

1. A method of manufacturing a flared printed circuit coil for an electro-magnetic deflection system of a cathode ray tube said method comprising the steps of forming a pattern of conductors upon a flat insulating carrying substrate, said pattern being that of a coil of turns each of which consists of three portions namely a first portion with a pair of conductive lengths diverging in the direction of one end of the coil and joined at their outer ends by a transverse arcuate length, a second portion with a pair of conductive lengths joined at their outer ends towards the other end of the coil by a transverse substantially straight length and a third portion with a pair of curved intermediate conductive lengths joining the inner ends of the divergent lengths to the inner ends of the substantially parallel lengths, said curved lengths being of substantially equal developed length; removing the substrate material in the region where the conductive lengths of the third portions of the turns are situated; and bending the regions where substrate is left and drawing apart said regions to straighten the originally curved conductive lengths.

2. A method of manufacturing a flared printed circuit coil for an electro-magnetic deflection system of a cathode ray tube said method comprising the steps of forming a pattern of conductors upon a flat insulating carrier substrate with an extensible middle part, said pattern being that of a coil of turns each of which consists of three portions namely a first portion with a pair of conductive lengths diverging in the direction of one end of the coil and joined at their outer ends by a transverse arcuate length, a second portion with a pair of conductive lengths joined at their outer ends towards the other end of the coil by a transverse substantially straight length and a third portion with a pair of curved intermediate conductive lengths joining the inner ends of the divergent lengths to the inner ends of the substantially parallel lengths, said third portion being carried by the extensible middle part of the substrate and said curved lengths being of substantially equal developed length; and bending the substrate and drawing apart the ends of the coil to straighten the originally curved conductive lengths.

* * * * *